No. 857,204. PATENTED JUNE 18, 1907.
J. C. REDEMER.
HUB.
APPLICATION FILED JUNE 23, 1906.
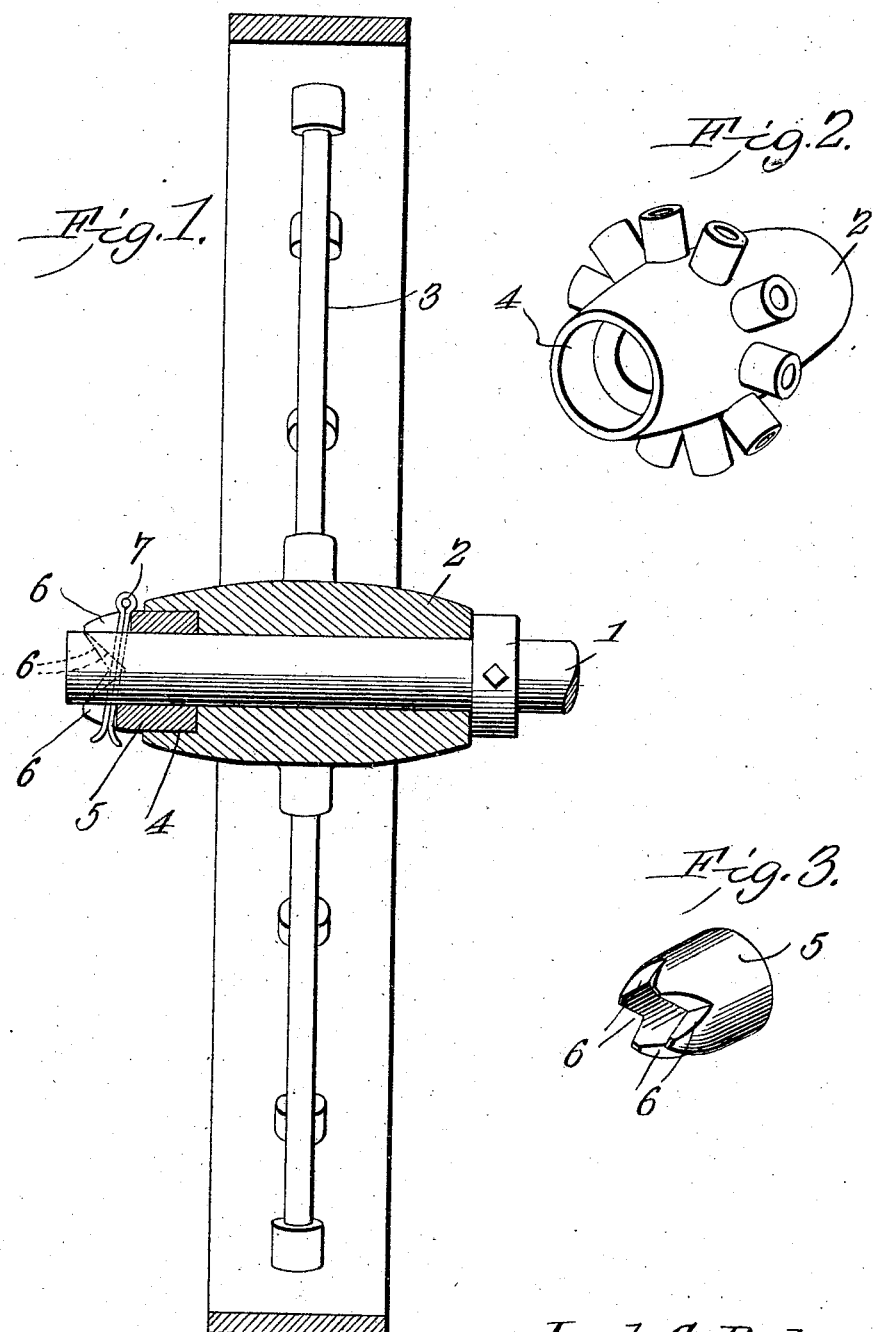
Jacob C. Redemer,
INVENTOR.
WITNESSES:
By C. A. Snow & Co.
ATTORNEYS

UNITED STATES PATENT OFFICE.

JACOB C. REDEMER, OF BEAVER, OKLAHOMA TERRITORY.

HUB.

No. 857,204.　　　Specification of Letters Patent.　　　Patented June 18, 1907.

Application filed June 23, 1906. Serial No. 323,091.

*To all whom it may concern:*

Be it known that I, JACOB C. REDEMER, a citizen of the United States, residing at Beaver, in the county of Beaver and Territory of Oklahoma, have invented a new and useful Hub, of which the following is a specification.

This invention relates to wheel hubs and is more particularly designed for use in connection with sulky plows and other wheeled agricultural machines. A great objection heretofore noted in the use of machines of this character has been the fact that the dirt carried upward by the wheels falls downward on to the hubs and works into the ends thereof. This is obviously very objectionable because it wears the parts and renders them hard to operate.

The object of the present invention is to provide a hub with means whereby the falling dirt can not work into the ends of the hub, said means being of very simple construction and adjustable so as to take up any wear which may occur between the parts.

With the above and other objects in view the invention consists of a hub having its outer end countersunk to receive a cap which is secured to the axle and serves to deflect from the end of the hub any dirt which may fall thereupon.

The invention also consists in so connecting the cap to the axle as to permit it to be adjusted longitudinally and held so as to compensate for any wear which might occur upon the cap and hub.

The invention also consists of certain other novel features of construction and combinations of parts which will be hereinafter more fully described and pointed out in the claims.

In the accompanying drawings is shown the preferred form of the invention.

In said drawings: Figure 1 is a section through a wheel having this improved hub; Fig. 2 is a detail view of the hub; and Fig. 3 is a similar view of the cap.

Referring to the figures by characters of reference, 1 is an axle on which is mounted a hub 2 having spokes 3 secured thereto in any preferred manner. The outer end of the hub is countersunk as shown at 4 and extending into this countersunk portion is the large end of a substantially frusto-conical tubular cap 5 the inner end of which is adapted to fit snugly within the hub. The outer or small end of said cap has a series of notches or recesses 6 therein of different depths and a pin 7 extends through the end portion of the axle and is adapted to rest within any two of these notches. As the notches are of different depths the wall of the deepest one will contact with the pin and the inner end of the cap will thus be held within the countersunk portion of the hub and form a tight fit. Should the contacting portions of the hub and cap become worn the parts can be tightened simply by removing the pin 7 and turning the cap until a smaller notch 6 is brought into position whereupon the pin can be reinserted and will hold the cap projected farther into the hub.

If, during the rotation of the wheel, any dirt should fall upon the hub it will be deflected outward therefrom by the frusto-conical cap and will not accumulate within the end of the hub. The adjustment of the cap can be easily effected without the use of a wrench or any other form of tool.

The preferred form of the invention has been set forth in the foregoing descriptions but I do not limit myself thereto as I am aware that modifications may be made therein without departing from the spirit or sacrificing the advantages thereof, and I therefore reserve the right to make such changes as fairly fall within the scope of the claims.

What is claimed is:

The combination with an axle; of a hub rotatably mounted thereon and having a countersunk end, a tubular frusto-conical cap having its large end fitted within the countersunk portion of the hub, the end of said cap having notches of different sizes therein, and means engaging the axle and adapted to be seated in any of said notches for holding the cap within the hub.

In testimony that I claim the foregoing as my own, I have hereto affixed my signature in the presence of two witnesses.

JACOB C. REDEMER.

Witnesses:
　H. S. JUDY,
　J. E. CAMPTON.